United States Patent Office.

OWEN DAVID LUCAS, OF LONDON, ENGLAND, ASSIGNOR TO LUCAS'S LOW PRESSURE OIL CRACKING PROCESS, LIMITED, OF LONDON, ENGLAND.

PROCESS OF MANUFACTURING CATALYTIC BODIES.

1,168,404.     Specification of Letters Patent.     Patented Jan. 18, 1916.

No Drawing.     Application filed March 4, 1915. Serial No. 12,193.

*To all whom it may concern:*

Be it known that I, OWEN DAVID LUCAS, a subject of the King of Great Britain, residing at 49 Linden Gardens, London, England, have invented new and useful Improvements in Processes of Manufacturing Catalytic Bodies, of which the following is a specification.

This invention relates to an improved process for the manufacture of catalytic bodies whereby catalysts of a very efficient type are produced.

According to this invention I heat to reduction and sinter a mixture comprising (a) a suitable powdered metallic oxid and (b) a suitable organic compound of a metal, which when heated at the temperature employed evolves CO or $CO_2$ or a mixture of these gases only or mixed with water, with the addition if necessary for reduction to the metallic state, of (c) a reducing agent either solid or which becomes solid upon the application of heat. As an example of such an organic compound of a metal, I may employ the oxalates or other organic compounds of the same type and certain carbonates. The metals I find particularly useful are those which have an atomic weight between fifty two and fifty nine, and comprise chromium, cobalt, nickel, iron and manganese. I briquet the above mixture with a suitable binding agent which may itself form all or part of the reducing agent. I may use a mixture of two or more oxids and two or more organic compounds. I sinter the briquets or mixture of said oxid and said salt, with or without a reducing agent, in an inclosed crucible so as to reduce the oxids, and the organic compounds of a metal or metals to the metallic form more or less completely such reduction being carried on below the fusing point of the metal. The result of the above process is a coherent substance of a spongy nature, particularly useful for use as a catalyst.

I select the metallic oxids and the metallic organic compound to suit the particular chemical reaction for which the catalyst is to be used. I find oxids of those metals which have an atomic weight between fifty two and fifty nine are useful and comprise chromium, cobalt, nickel, iron and manganese. As oxids commercial ferric oxid may be employed, but the oxid of nickel or cobalt employed should be made by the treatment of their acetate, carbonate or hydrated oxid. Suitable carbonates are those of nickel, iron and manganese.

As an example, in order to produce a catalyst suitable for the production of light hydrocarbons from heavy hydrocarbons I may take a mixture of the oxids and oxalates of iron and nickel, with carbon as a reducing agent and tar as a binding material. I thereby obtain a catalytic substance containing pure nickel and iron. Suitable proportions are as follows:

| | | |
|---|---:|---|
| Ferric oxids | 32 | parts. |
| Nickel oxids | 7.5 | " |
| Carbon | 5.5 | " |
| Ferrous oxalate | 40 | " |
| Nickel oxalate | 15 | " |
| | 100 | " |

The above powders are intimately mixed and incorporated with $17\frac{1}{2}\%$ by weight of tar which is then formed into a briquet and treated as above described.

Another catalyst suitable for the same purpose may be made from a mixture consisting of:

| | |
|---|---:|
| Red oxid of iron | 35 |
| Manganese carbonate | 27 |
| Carbon | 3 |
| Aluminium | 5 |
| Ferrous oxalate | 30 |
| | 100 |
| Tar (binder) | 17.5 | or of:

| | |
|---|---:|
| Ferric oxid | 36 |
| Nickel oxid | 15 |
| Aluminium | 3 |
| Iron tartrate | 30 |
| Nickel acetate | 16 |
| | 100 |
| Tar (binder) | 17.5 |

The above process can be equally well applied to similar compounds of other catalytic metals capable of direct reduction in the presence of a reducing agent, for example, chromium or cobalt, and in each case a suitable catalytic body is produced.

I find in many cases the production of the desired material is facilitated by the addition of small quantities of what is known as a catalytic enhancer such as aluminium, cerium, magnesium or other members of the same class as is illustrated in the second and third examples.

These substances while acting as reducing agents appear to have a specific action in assisting the production of the catalytic bodies as described. In the first example given above, I may for instance replace a portion of the carbon by powdered aluminium to the extent of 1.5% of the total weight of the mixed powders.

The improved catalytic bodies produced as above described do not appear to lose in efficiency after continued use, in fact in some cases their efficiency appears to increase after a short period of use.

The reducing agent which I employ is carbonaceous, being in the form of a solid carbon or pitch, tar or the like which becomes solid carbon on heating. Where in the claims I specify a solid carbon I wish to cover as an equivalent a reducing agent which becomes solid on heating, solid carbon being formed in the process. I do not employ a reducing agent such as hydrocarbon in a gaseous form. I have heretofore referred in the specification to a metallic compound comprising besides the metal carbon and oxygen only or carbon, oxygen and hydrogen only. In the former case I refer to a metallic carbonate and in the latter to bodies having a C O O H radical as distinguished from nitro compounds whose gases are explosive. Such compounds, i. e., those containing carbon and oxygen only or those containing carbon, oxygen and hydrocarbon only may be generically specified as a metallic compound containing a carbon-oxygen radical.

What I claim is:—

1. A process of making a catalytic body which comprises heating to a sintering temperature, a mixture comprising (a) a reducible oxygen-containing compound of a metal having an atomic weight between 52 and 59, (b) a non-explosive metallic compound capable upon heating, of generating non-oxidizing gases containing an oxid of carbon, and (c) a carbonaceous reducing agent.

2. A process of making a catalytic body which comprises heating to a sintering temperature a mixture comprising (a) a reducible oxygen-containing compound of a metal having an atomic weight between 52 and 59, (b) a non-explosive metallic compound capable upon heating, of generating non-oxidizing gases containing an oxid of carbon, said compound having reducing properties, and (c) a carbonaceous reducing agent.

3. A process of making a catalytic body, which comprises heating to a sintering temperature, a mixture comprising (a) a reducible oxygen-containing compound of a metal having an atomic weight between 52 and 59, (b) a non-explosive metallic compound capable upon heating, of generating a gas mixture containing carbon monoxid, and (c) a carbonaceous reducing agent.

4. A process of making a catalytic body, which comprises heating to a sintering temperature, a mixture containing (a) a reducible oxygen-containing compound of a catalytic metal, (b) a salt of a catalytic metal which upon being heated is capable of liberating non-oxidizing gases containing carbon monoxid, and (c) a carbonaceous reducing agent.

5. A process of making a catalytic body, which comprises heating to a sintering temperature a briqueted mixture containing (a) a reducible oxygen-containing compound of a catalytic metal, (b) a salt of a catalytic metal which upon being heated is capable of liberating non-oxidizing gases containing carbon monoxid, and (c) a carbonaceous reducing agent.

6. A process of manufacturing catalytic bodies by heating to reduction and sintering a mixture containing a reducing agent, iron oxid and iron oxalate.

7. A process of manufacturing catalytic bodies by heating to reduction and sintering a mixture of iron oxid, iron oxalate, and a carbonaceous reducing agent.

8. A process of manufacturing catalytic bodies by heating to reduction and sintering a mixture comprising iron oxid, iron oxalate, a metallic reducing agent and another solid reducing agent.

9. A process of manufacturing catalytic bodies by heating to reduction and sintering a mixture comprising iron oxid, iron oxalate, aluminum and a carbonaceous reducing agent.

10. A process of manufacturing catalytic bodies by heating to reduction and sintering a mixture comprising iron oxid, nickel oxid, iron oxalate, nickel oxalate and a carbonaceous reducing agent.

11. A process of making a catalyst which comprises reducing to the metallic state a mixture containing an oxid of a catalytic metal, and a compound of a metal capable of liberating gases containing oxids of carbon.

12. A process of making a catalyst which comprises reacting with a reducing agent upon a mixture containing an oxid of a catalytic metal, and a compound of a metal capable of liberating gases containing oxids of carbon, and heating the same to a sintering temperature.

13. A process of making a catalyst which comprises reducing a mixture containing an oxid of a catalytic metal, and an oxalate of a catalytic metal, by means of a solid reducing agent mixed therewith, and heating the same to a sintering temperature.

14. A process of making a catalyst which comprises subjecting to a sintering temperature, under reducing conditions, a mixture comprising a reducible oxygen-containing compound of a catalytic metal, and a reducible organic compound of a catalytic metal.

15. A process of making a catalyst which comprises subjecting to a sintering temperature, a mixture comprising a reducible oxygen-containing compound of a catalytic metal, and a reducible organic compound of a catalytic metal, in the presence of a reducing agent comprising a small amount of a metal whose oxid is reducible and which acts as a catalytic enhancer.

16. A process of making a catalyst which comprises subjecting to a sintering temperature, a mixture comprising a reducible oxygen-containing compound of a catalytic metal, and a reducible organic compound of a catalytic metal in the presence of a reducing agent comprising a small amount of aluminum.

17. A process of making a catalyst which comprises briqueting a mixture comprising a reducible oxygen-containing compound of a catalytic metal, and a compound of a catalytic metal, which compound upon being heated will produce gases containing an oxid of carbon, and a small amount of aluminum, said briqueting operation being effected by means of a carbonaceous binder, and thereafter heating the briquets sufficiently to reduce the said two compounds to the metallic condition.

18. The process of making a catalyst which comprises mixing together the oxid of an element having an atomic weight between 52 and 59, and an organic salt of a metal which salt evolves when heated, reducing gases containing carbon, and subjecting the mixture so made to a sintering heat.

19. A process of making a catalyst which comprises mixing together a binder having reducing properties the oxid of an element having an atomic weight between fifty-two and fifty-nine; and an organic salt of a metal which salt evolves when heated, a gas containing oxygen and carbon, and subjecting the mixture so made to a sintering heat.

20. A process of making a catalyst which comprises mixing together a reducible compound of an element having an atomic weight between fifty-two and fifty-nine; and an organic salt of a metal which salt evolves when heated, a carbon-oxygen-containing gas; and a binder containing a reducing agent, and subjecting the mixture so made to a sintering heat.

21. The process of manufacturing a catalyst which comprises mixing together an oxid of a metal having an atomic weight between fifty-two and fifty-nine, an oxalate of a metal having an atomic weight between fifty-two and fifty-nine, and a carbonaceous binder, and sintering in reducing environment.

22. The process of manufacturing a spongy iron catalyst which comprises mixing together iron oxid, an iron oxalate, a binder having reducing qualities, and sintering in a closed receptacle.

23. The process of manufacturing a spongy iron catalyst which comprises mixing together ferric oxid, ferrous oxalate, a carbonaceous reducing agent, and tar, and sintering in a closed receptacle.

24. The process of manufacturing a spongy iron catalyst which comprises mixing together ferric oxid, ferrous oxalate, a carbonaceous reducing agent, a metallic reducing agent, and tar, and sintering in a closed receptacle.

25. The process of manufacturing a spongy iron catalyst which comprises mixing together ferric oxid, ferrous oxalate, a carbonaceous reducing agent, aluminum, and tar, and reducing at a temperature below complete fusion.

OWEN DAVID LUCAS.

Witnesses:
 JOHN H. WHITEHEAD,
 FRED WEATHERBY.